US012802267B2

(12) United States Patent
Gonzalez Garcia

(10) Patent No.: US 12,802,267 B2
(45) Date of Patent: Nov. 17, 2026

(54) THREE DIMENSIONAL HAND POSE ESTIMATOR

(71) Applicant: Hinge Health, Inc., San Francisco, CA (US)

(72) Inventor: Abel Gonzalez Garcia, Montreal (CA)

(73) Assignee: Hinge Health, Inc., San Francisco, CA (US)

(*) Notice: Subject to any disclaimer, the term of this patent is extended or adjusted under 35 U.S.C. 154(b) by 313 days.

(21) Appl. No.: 18/402,510

(22) Filed: Jan. 2, 2024

(65) Prior Publication Data

US 2024/0135581 A1 Apr. 25, 2024

Related U.S. Application Data

(63) Continuation of application No. PCT/IB2021/056150, filed on Jul. 8, 2021.

(51) Int. Cl.
*G06T 7/73* (2017.01)

(52) U.S. Cl.
CPC ...... *G06T 7/74* (2017.01); *G06T 2207/30196* (2013.01)

(58) Field of Classification Search
CPC ............. G06T 7/74; G06T 2207/30196; G06T 2207/20084; G06T 7/73; G06T 13/00; G06F 3/017; G06V 40/25; G06V 40/28
See application file for complete search history.

(56) References Cited

U.S. PATENT DOCUMENTS

| | | | | |
|---|---|---|---|---|
| 10,937,185 B2 | 3/2021 | Pescaru | | |
| 2015/0186716 A1* | 7/2015 | Litvak | .................... | G06V 20/64 382/154 |

(Continued)

FOREIGN PATENT DOCUMENTS

WO 2021000401 A1 1/2021

OTHER PUBLICATIONS

J. Y. Chang, G. Moon and K. M. Lee, "V2V-PoseNet: Voxel-to-Voxel Prediction Network for Accurate 3D Hand and Human Pose Estimation from a Single Depth Map," 2018 IEEE/CVF Conference on Computer Vision and Pattern Recognition, Salt Lake City, UT, USA, 2018, pp. 5079-5088 (Year: 2018).*

(Continued)

*Primary Examiner* — Oneal R Mistry
*Assistant Examiner* — Rachel L Roberts
(74) *Attorney, Agent, or Firm* — Ashurst Perkins Coie US LLP; Andrew T. Pettit

(57) ABSTRACT

An apparatus is provided to generate a three-dimensional representation of a pose. The apparatus includes a communications interface to receive raw data from an external source. The raw data includes a representation of an object. In addition, the apparatus includes a memory storage unit to store the raw data. Furthermore, the apparatus includes a pre-processing engine to identify a plurality of visible keypoints from the raw data. The apparatus also includes a keypoint analysis engine to identify a connector between a first visible keypoint from the plurality of visible keypoints and a second visible keypoint from the plurality of visible (Continued)

keypoints. The apparatus further includes a pose estimation engine to generate a vector to represent the connector. The vector has a normalized magnitude.

20 Claims, 7 Drawing Sheets

(56) References Cited

U.S. PATENT DOCUMENTS

2017/0168586 A1* 6/2017 Sinha .................... G06N 20/00
2021/0117661 A1* 4/2021 Iqbal ..................... G06V 10/82

OTHER PUBLICATIONS

Iqbal, Umar, et al. "Hand pose estimation via latent 2.5 d heatmap regression." Proceedings of the European conference on computer vision (ECCV). 2018 (Year: 2018).*

Liao, et al., "Joint-oriented Features for Skeleton-based Action Recognition", 2019 IEEE International Conference on Systems, Man, and Cybernetics (SMC)., Oct. 6, 2019, 1154-1159.

Wohlke, et al., "Model-based Hand Pose Estimation for Generalized Hand Shape with Appearance Normalization", arXiv 1807.00898, Computer Science: Computer Vision and Pattern Recognition., Jul. 2, 2018, 1-8.

Thompson, et al., "Real-Time Continuous Pose Recovery of Human Hands Using Convolutional Networks", ACM Transactions on Graphics (TOG), vol. 33, Issue 5, pp. 1-10, https://dl.acm.org/doi/10.1145/2629500, Sep. 23, 2014 (Sep. 23, 2014).

Tome, et al., "Lifting from the Deep: Convolutional 3D Pose Estimation from a Single Image", arxiv.org, Cornell University Library, 201 Olin Library Cornell University Ithaca, NY 14853, Jan. 1, 2017.

International Search Report and Written Opinion mailed Mar. 14, 2022 for International Patent Application No. PCT/IB2021/056150; 7 pages.

Li , et al., "Reconstructing Hand Poses Using Visible Light", Proceedings of the ACM on Interactive, Mobile, Wearable and Ubiquitous Technologies, vol. 1, No. 3, retrieved from the internet at https://dl.acm.org/doi/pdf/10.1145/3130937, Sep. 2017, pp. 71-91.

Woehlke , et al., "Model-based Hand Pose Estimation for Generalized Hand Shape with Appearance Normalization", Retrieved online on Jan. 31, 2022 from the Internet: <https://arxiv.org/pdf/1807.00898.pdf>, Jul. 2, 2018, pp. 1-8.

* cited by examiner

110

THREE DIMENSIONAL HAND POSE ESTIMATOR

CROSS-REFERENCE TO RELATED APPLICATION

This application is a continuation of International Patent Application No. PCT/IB162021/056150, titled "THREE DIMENSIONAL HAND POSE ESTIMATOR" and filed on Jul. 8, 2021, which is incorporated herein by reference in its entirety.

BACKGROUND

Pose estimation is used to extract a pose of an object from an image. For example, an image of a hand may show it in one of many possible poses. For example, the hand may be clenched in a fist, the hand may be held open, a finger may be pointing, etc. In this example, the pose of the hand may be described using keypoints representing joints and connectors between some keypoints representing bones. The pose may then be used in a three-dimensional model to animate the object.

BRIEF DESCRIPTION OF THE DRAWINGS

Reference will now be made, by way of example only, to the accompanying drawings in which.

DETAILED DESCRIPTION

Figure 1:
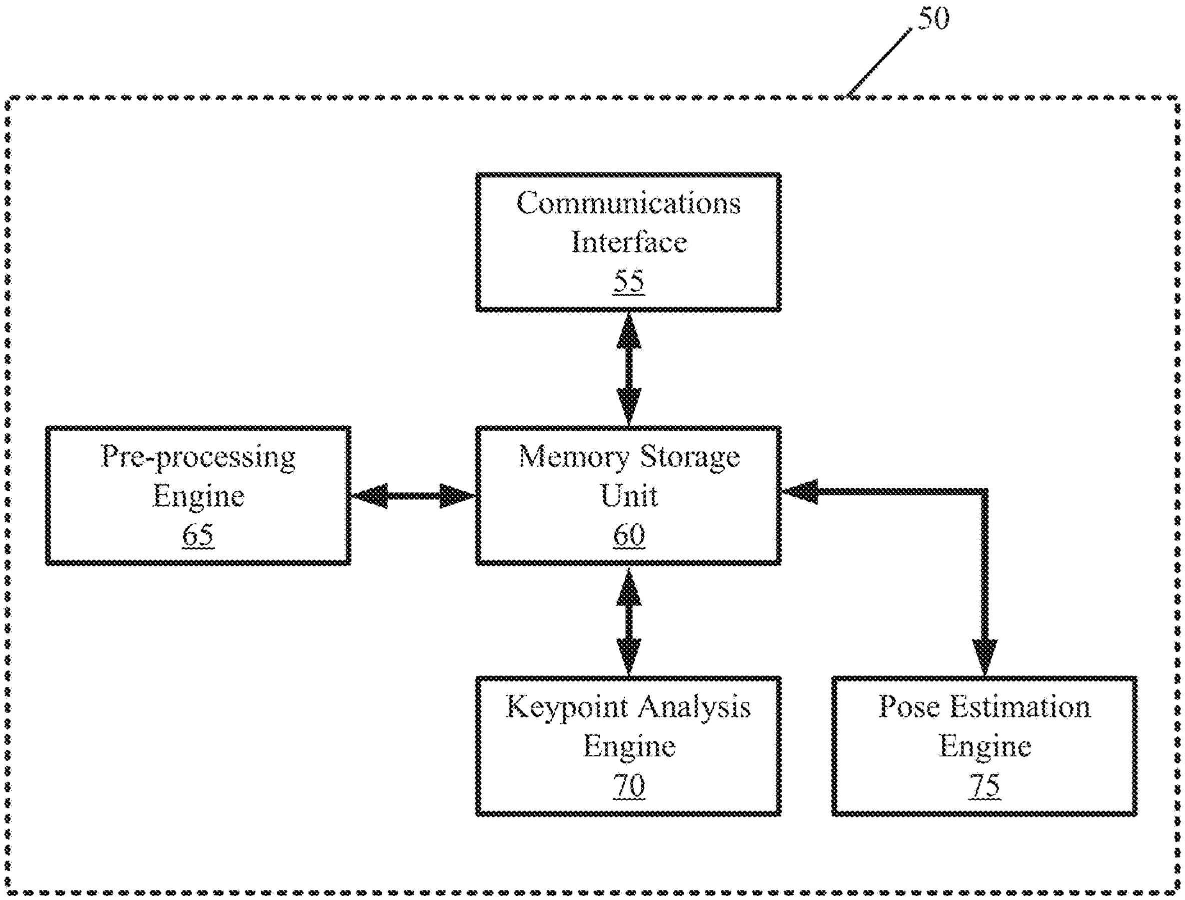
FIG. 1 is a schematic representation of the components of an example apparatus to generate a three-dimensional representation of a pose.

As used herein, any usage of terms that suggest an absolute orientation (e.g. "top", "bottom", "up", "down", "left", "right", "low", "high", etc.) may be for illustrative convenience and refer to the orientation shown in a particular figure. However, such terms are not to be construed in a limiting sense as it is contemplated that various components will, in practice, be utilized in orientations that are the same as, or different than those described or shown.

Computer animation is used in a broad range of different sectors to provide motion to various objects, such as people. In many examples of computer animation, a three-dimensional representation of an object in one or more poses is created and moved. In some examples, the object may have multiple poses. The poses are not particularly limited and may be dependent on what the object is and the expected motions and range of motion about certain keypoints. For example, if the object is a hand of a person, the hand may have multiple poses and may be animated to move between different poses. Furthermore, it is to be appreciated by a person of skill with the benefit of this description that a hand may not be identical among different characters. However, the hand may be expected to have similar poses that may be considered to look natural. In other examples, the object may be another part of the body, such as a foot. In further examples, the object may not be a person and may be any other type of object having multiple poses.

Accordingly, the object to be animated is to be represented by a plurality of keypoints. The position as well as the available range of motion at each keypoint will provide the object with the appearance of natural poses. However, in some applications, a pose may be applied to different objects with different dimensions or scales. Continuing with the example above, a pose of a hand may be extending the index finger with the remaining fingers to signal the number one. To apply this pose to a different hand having a different size or a different proportion between the keypoints, such as a hand with longer fingers, a model representing the pose in a scale agnostic manner.

An apparatus and method of generating a three-dimensional pose for an object using normalized direction vectors to represent the pose in a manner that is agnostic to the scaling and object. The scale agnostic representation of the pose focuses on an actual three-dimensional pose of the object rather than its actual scale or shape. Accordingly, the scale agnostic representation of the pose may be subsequently used in a downstream process such as rotation estimation about a keypoint or application to similar objects having different scales.

In the present description, the models and techniques discussed below are generally applied to a hand of a person. It is to be appreciated by a person of skill with the benefit of this description that the examples described below may be applied to other objects, such as other parts of a person or to animals and machines.

Figure 2:
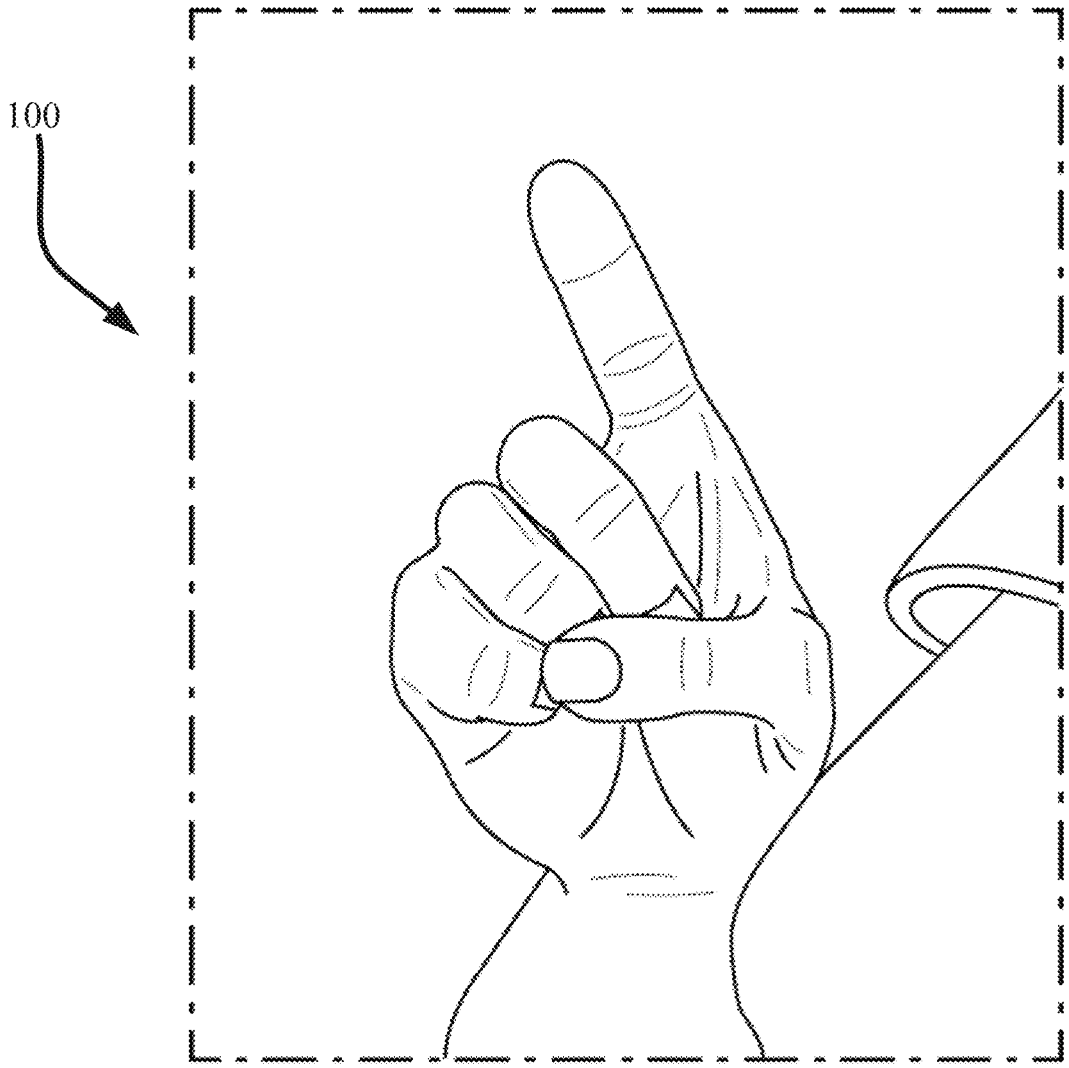
FIG. 2 is an example of raw data representing an image received at the apparatus of FIG. 1.

Referring to FIG. 1, a schematic representation of an apparatus to generate a three-dimensional representation of a pose is generally shown at 50. The apparatus 50 may include additional components, such as various additional interfaces and/or input/output devices such as indicators to interact with a user of the apparatus 50. The interactions may include viewing the operational status of the apparatus 50 or the system in which the apparatus 50 operates, updating parameters of the apparatus 50, or resetting the apparatus 50. In the present example, the apparatus 50 is to receive raw data, such as raw data represent an image 100 as shown in FIG. 2, and to process the raw data to generate a three-dimensional representation of the pose of the object in the image 100. In the present example, the apparatus 50 includes a communications interface 55, a memory storage unit 60, a pre-processing engine 65, a keypoint analysis engine 70, and a pose estimation engine 75.

The communications interface 55 is to communicate with an external source to receive raw data representing an object. In the present example, the communications interface 55 may communicate with external source over a network, which may be a public network shared with a large number of connected devices, such as a WiFi network or cellular network. In other examples, the communications interface 55 may receive data from an external source via a private network, such as an intranet or a wired connection with other devices. As another example, the communications interface 55 may connect to another proximate device via a wired connection, a Bluetooth connection, radio signals, or infrared signals. In particular, the communications interface 55 is to receive raw data from the external source to be stored on the memory storage unit 60.

The external source from which the raw data is received is not particularly limited. For example, the external source may be an image capturing system such as a camera, smartphone, or tablet. In other examples, the external source may be a database of the object in a pose. Furthermore, the external source may be substituted with computer generated pose of the object.

The memory storage unit 60 is to store the raw data received via the communications interface 55. In particular, the memory storage unit 60 may store raw data including two-dimensional images representing objects from which a three-dimensional representation of a pose is to be generated. The representation of the object received by the communications interface is not particularly limited. In the present example, the object is a hand of a person. It is to be appreciated by a person of skill with the benefit of this description that a hand may have many different poses. Accordingly, the image 100 is to capture the hand in one of those poses, such as with the index finger extended from a first position. In other examples, the image 100 may be substituted with a hand in another pose. In further examples, the object may be another body part of a person such as a foot or face. In another example, the object may not be part of a person and may be another type of object such as an animal or machine.

The memory storage unit 60 may be also used to store addition data to be used by the apparatus 50. For example, the memory storage unit 60 may store various reference data sources, such as templates and model data. Accordingly, it is to be appreciated that the memory storage unit 60 may be a physical computer readable medium used to maintain multiple databases, or may include multiple mediums that may be distributed across one or more external servers, such as in a central server or a cloud server. In some examples, the memory storage unit 60 may be preloaded with data, such as training data or instructions to operate components of the apparatus 50. In other examples, the instructions may be loaded via the communications interface 55 or by directly transferring the instructions from a portable memory storage device connected to the apparatus 50, such as a memory flash drive.

In the present example, the memory storage unit 60 includes a non-transitory machine-readable storage medium that may be any electronic, magnetic, optical, or other physical storage device. The memory storage unit 60 may be used to store information such as data received from external sources via the communications interface 55, template data, training data, pre-processed data from the pre-processing engine 65, results from the keypoint analysis engine 70, or results from the pose estimation engine 75. In addition, the memory storage unit 60 may be used to store instructions for general operation of the apparatus 50. For example, the memory storage unit 60 may store an operating system that is executable by a processor to provide general functionality to the apparatus 50 such as functionality to support various applications. The memory storage unit 60 may additionally store instructions to operate the pre-processing engine 65 and the neural network engine 70. The memory storage unit 60 may also store control instructions to operate other components and any peripheral devices that may be installed with the apparatus 50, such cameras and user interfaces.

Figure 3:
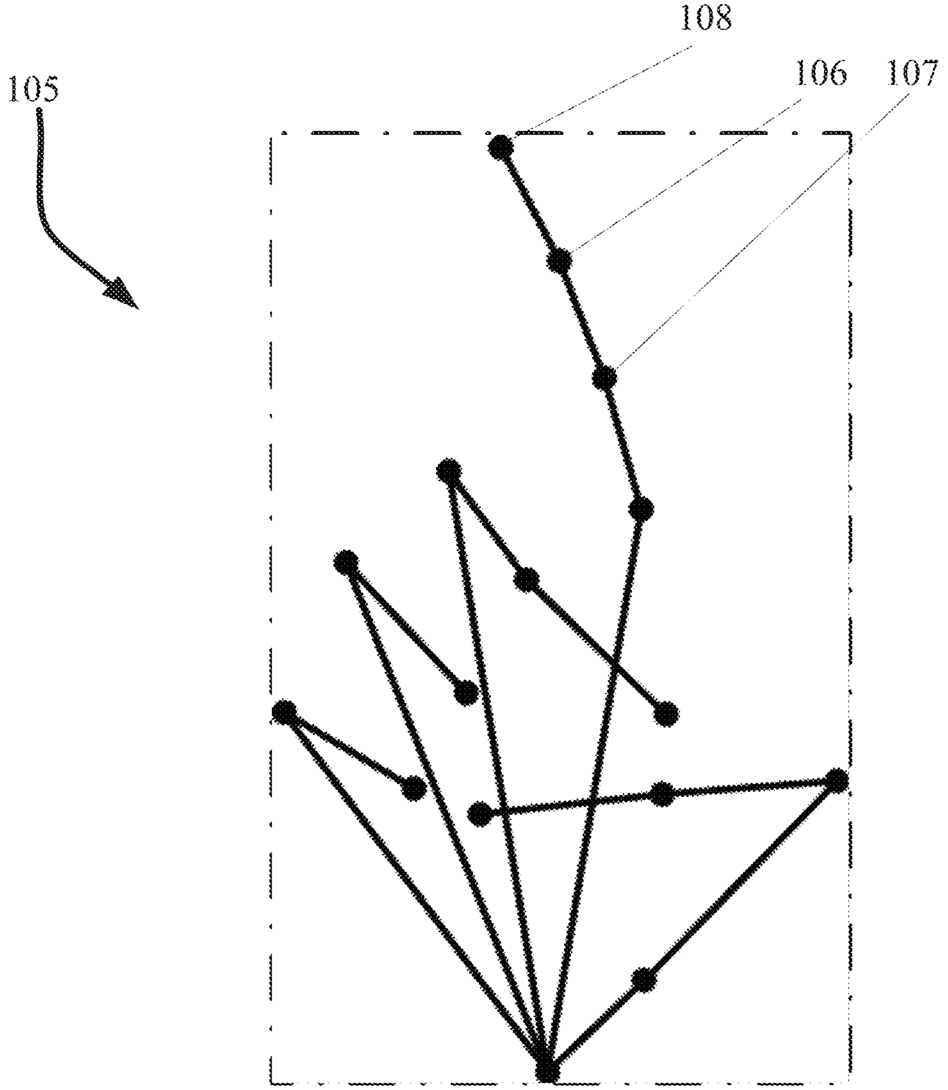
FIG. 3 is a two-dimensional keypoint map of the image of FIG. 2.

The pre-processing engine 65 is to identify keypoints from the raw data to generate a keypoint map 105 from the image 100 as shown in FIG. 3. In particular, the pre-processing engine 65 is to identify the keypoints that are visible in the raw data image 100 to generate keypoint coordinates in two-dimensions on the raw data image 100. The manner by which the keypoints are identified is not particularly limited. For example, the keypoints may be extracted from the two-dimensional image based on matching a set of predefined keypoint definitions from a known structure of the object.

In particular, the pre-processing engine 65 may generate a keypoint heatmap for each keypoint. The keypoint heatmap generated by the pre-processing engine 65 is to generally provide representation of the position of a point on the object. In the present example, the keypoint heatmap is a two-dimensional map. The point of interest on the object is a keypoint which may correspond to a joint or position where the object carries out relative motions between different portions of the object. Continuing with the present example of a hand as the object, a keypoint may represent a joint in the hand, such as a knuckle or finger joint. The keypoint heatmap includes a confidence value for each pixel of the image 100 to indicate likelihood of whether the pixel is where the keypoint of interest is located. Accordingly, the keypoint heatmap typically shows a single hotspot where the pre processing engine 65 has determined the predefined keypoint of interest to be located. It is to be appreciated that in some examples, the pre-processing engine 65 may be part of an external system providing pre-processed data or the pre-processed data may be generated by other methods, such as manually by a user.

It is to be appreciated by a person of skill with the benefit of this description that a separate keypoint heatmaps are generated each of the predefined keypoints. In the specific example of a hand of a person, multiple keypoints may be predefined and represent points where the hand may have relative motion, such as a joint which rotates bones connected to it. It is to be further understood that for each keypoint, a certain range of motion or characteristics about the keypoint may be approximated. For example, a keypoint representing a knuckle may have a predefined range of motion, such as 90 degrees and a limited degree of freedom to be within a plane. In the present example, it is also to be understood by a person of skill with the benefit of this description that more predefined keypoints identified for an object allows for a more accurate and realistic depiction of the hand.

In the present specific example, the pre-processing engine 65 is configured to identify and locate 21 keypoints in a human hand. In particular, the 21 keypoints include the joints listed in Table 1 below represent the keypoints used in for a human hand.

TABLE 1

| | |
|---|---|
| Wrist | Middle Proximal Interphalangeal |
| Thumb Metacarpophalangeal | Middle Tip |
| Thumb Distal Interphalangeal | Ring Metacarpophalangeal |
| Thumb Proximal Interphalangeal | Ring Distal Interphalangeal |
| Thumb Tip | Ring Proximal Interphalangeal |
| Index Metacarpophalangeal | Ring Tip |
| Index Distal Interphalangeal | Pinky Metacarpophalangeal |
| Index Proximal Interphalangeal | Pinky Distal Interphalangeal |
| Index Tip | Pinky Proximal Interphalangeal |
| Middle Metacarpophalangeal | Pinky Tip |
| Middle Distal Interphalangeal | |

The generation of each keypoint heatmap is not particularly limited and may involve various image processing engines. In the present example, a computer vision-based human pose system such as the wrnchAI engine is used to identify each keypoint and to assign a confidence value to the position of the keypoint in the raw data. In other examples, other types of human pose systems may be used such as OpenPose, Google Blaze Pose, Mask-R CNN, or other human pose systems such as Microsoft Kinect or Intel RealSense. In further examples, the human pose may alternately be annotated by hand in an appropriate key-point annotation tool such as Keymakr.

In some examples of poses, it is to be appreciated by a person of skill with the benefit of this description that some of the predefined keypoints for which the pre processing engine 65 is to identify may not be visible or present in the image 100 of the raw data. For example, the keypoint may be a predefined joint that is invisible or occluded by other portions of the object. In such examples, the pre-processing engine 65 may estimate the position of the invisible keypoint. The manner by which the pre-processing engine 65 estimates the position the invisible keypoint is not particularly limited. In one example, the invisible keypoint may be inferred using a known kinematic chain if proximate keypoints in the kinematic chain are visible.

Upon determining the heatmaps for the keypoints in two-dimension, the three-dimensional position of the keypoints are inferred. The manner by which the three-dimensional positions of the keypoints are determined is not particularly limited. In the present example, a lifting approach may be used to regress a depth value for each keypoint.

In other examples, a depth heatmap may be generated for each of the keypoint heatmaps. Each depth heatmap estimator may be determined using a trained machine learning model, such as a convolutional neural network, or a recurrent neural network, a random forest model, or a deep neural network. In a specific example of a convolutional neural network, the architecture may include three-dimensional convolutional layers that extract features (such as object boundaries, occlusions, spatial orderings, texture and color patterns, lighting features) from the raw data image 100 to generate the depth heatmap. Upon determination of the depth heatmap, the depth heatmap may be combined with the associate keypoint heatmap to generate a three-dimensional heatmap of the position of the associated predefined keypoint. The three-dimensional position of the predefined keypoint may then be chosen to be a position of high probability.

The keypoint analysis engine 70 is to identify a connector between two keypoints identified by the pre-processing engine 65. The manner by which the keypoint connectors are identified is not particularly limited. For example, the keypoint analysis engine 70 may use the definitions for each of the keypoints identified by the pre-processing engine 65 to assign a connector between two keypoints. The definitions for each keypoint may include information about neighboring keypoints. As a specific example, each keypoint may represent a joint in a human hand. Accordingly, the definition of a joint may include its relative position in the hand and the neighboring joint or joints connected by a bone. In particular, the keypoint 106 may be associated with a distal interphalangeal joint in the hand and defined to be connected to a metacarpophalangeal joint and a distal interphalangeal joint. The keypoint analysis engine 70 will then connect the keypoint 106 to the keypoint 107 associated with the metacarpophalangeal joint and the keypoint 108 associated with the distal interphalangeal joint based. This process may be iterated until all connections in the keypoint definitions have been made based on the keypoint heatmaps generated by the pre-processing engine 65. In other examples, the keypoint analysis engine 70 may use a known structure to identify the keypoint connectors identified by the pre processing engine 65 instead of making a determination at each keypoint.

In the present example, the keypoint analysis engine 70 is to identify keypoint connectors that are completely visible in the image 100. A keypoint connector is deemed visible when the end keypoints of the keypoint connector are both visible. In some examples, the invisible keypoints may be used to estimate a keypoint connector between a visible keypoint and an invisible keypoint. In other examples, a keypoint connector may be estimated between two invisible keypoints as determined by the pre-processing engine 65. The manner by which invisible keypoint connectors are estimate is not particularly limited. For example, a keypoint connector may be estimated based on a calculation from a break on the kinematic chain to estimate the keypoint connector to complete the kinematic chain. In the example of a hand of a person, it is to be appreciated by a person of skill with the benefit of this description that it may be common self-occlusion in various poses. For example, only the keypoints corresponding to distal joints of the fingers may be seen when a hand is holding a large object or clenched in a fist.

Figure 4:
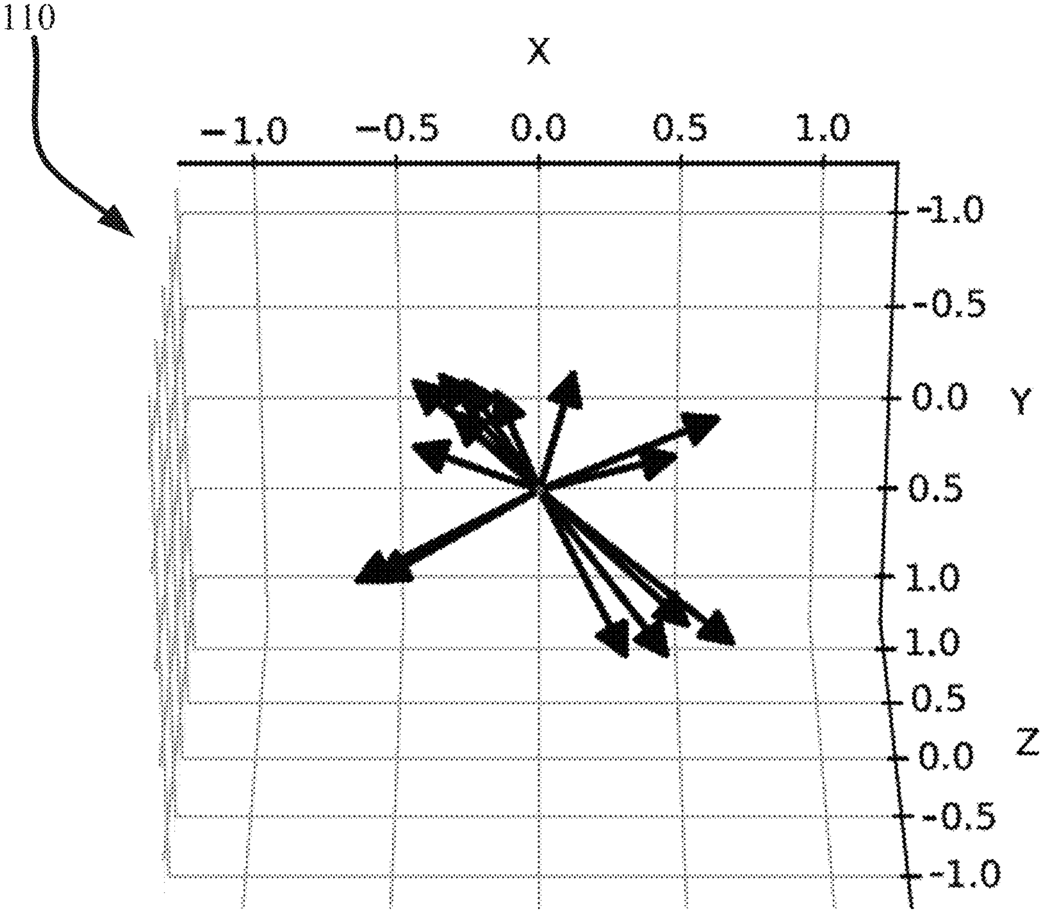
FIG. 4 is a three-dimensional vector representation of a pose of the image of FIG. 2.

The pose estimation engine 75 is to generate a vector for each keypoint connector to represent the keypoint connector. The vector includes a direction and is to be normalized to a magnitude, such as one. Each vector is to start from the same reference point, for example, by subtracting its three-dimensional position. Accordingly, the pose estimation engine 75 to generates a three-dimensional representation 110 of a pose with a plurality of vectors as shown in FIG. 4. The vectors generated by the pose estimation engine will be a scale-agnostic representation from which the object may be manipulated, such as via animation of the different connectors. The visual representation may be reconstructed using the vectors and any scaling for the object.

It is to be appreciated by a person of skill with the benefit of this description that this scale-agnostic representation of the pose of an object, such as a hand of a person, may be used to generate a set of 3D vectors of unit length that represent the pose from the image 100. The manner by which the apparatus 50 generates this representation is not particularly limited. For example, a neural network with a combination of convolutional and fully connected layers similar to those used for direct regression of the three-dimensional keypoints may be used.

By using the scale-agnostic representations, a corresponding pose may be generated by applying a structure in the associated keypoint connector definitions. Starting at a root and following each kinematic chain, the vectors corresponding to the hand may be accumulated along the direction of each vector. Since the scale-agnostic representation has unitary vectors, it will result in an estimated pose in which all connectors have unit length, which does not represent an anatomically correct hand. The pose estimation engine 75 may then scale the keypoint connectors in accordance with a set of bone lengths defined in a template of the object. When employing these realistic scales, the resulting pose will be visually pleasing. The template is not particularly limited and it is to be appreciated that the template may be modified to achieve different shapes and scales.

Figure 5:
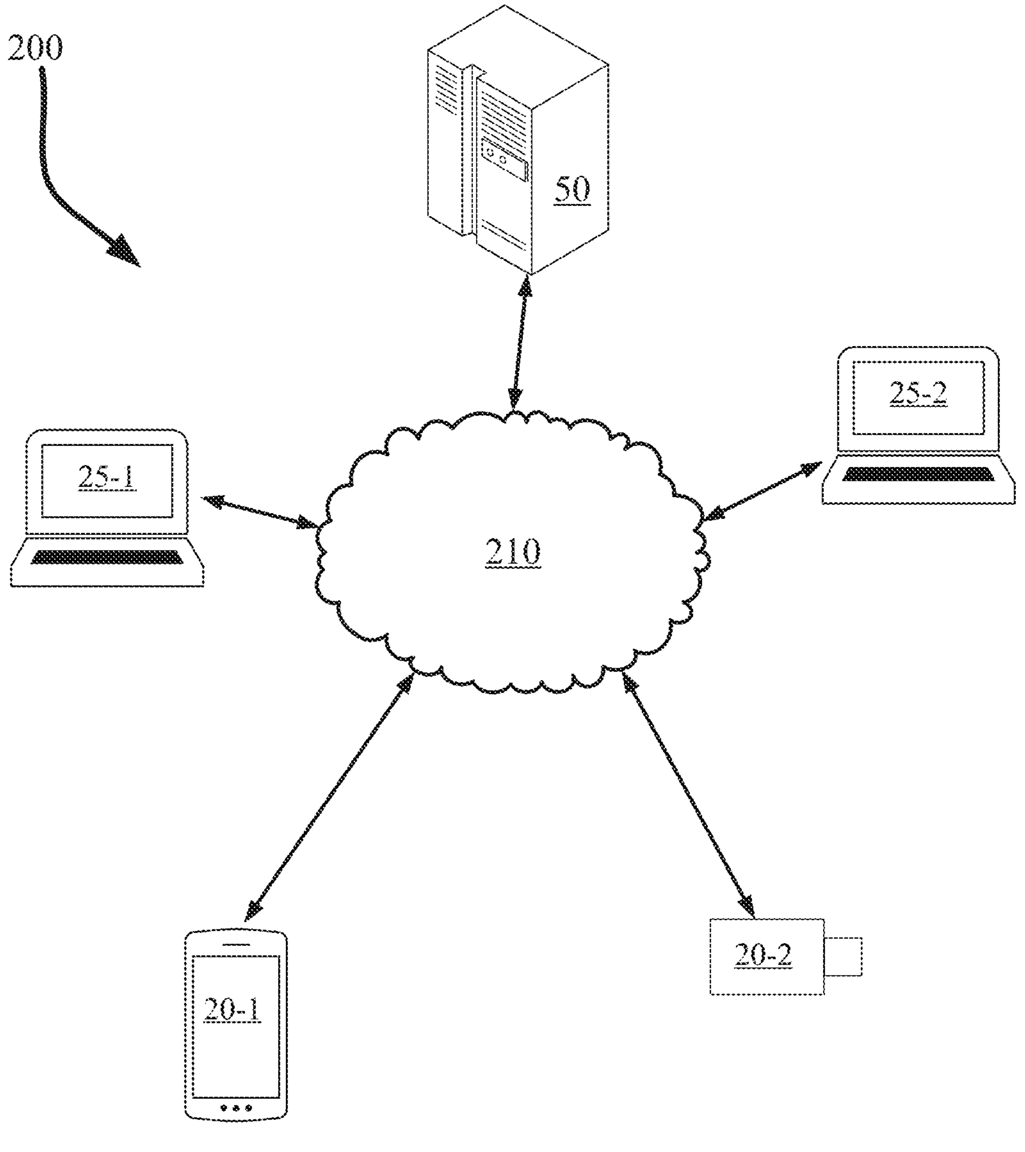
FIG. 5 is a schematic representation of a to generate a three-dimensional representation of a pose.

Referring to FIG. 5, a schematic representation of a computer network system is shown generally at 200. It is to be understood that the system 200 is purely exemplary and it will be apparent to those skilled in the art that a variety of computer network systems are contemplated. The system 200 includes the apparatus 50 to generate and assign a mechanical weight index based on a single two-dimensional image for mesh skinning, a plurality of external sources 20-1 and 20-2 (generically, these external sources are referred to herein as "external source 20" and collectively they are referred to as "external sources 20"), and a plurality of content requesters 25-1 and 25-2 (generically, these content requesters are referred to herein as "content requesters 25" and collectively they are referred to as "content requesters 25") connected by a network 210. The network 210 is not particularly limited and may include any type of network such as the Internet, an intranet or a local area network, a mobile network, or a combination of any of these types of networks. In some examples, the network 210 may also include a peer to peer network.

In the present example, the external sources 20 may be any type of computing device used to communicate with the apparatus 50 over the network 210 for providing raw data such as an image 100 of an object, such as a hand of person in a pose. For example, the external source 20-1 may be a smartphone. It is to be appreciated by a person of skill with the benefit of this description that the external source 20-1 may be substituted with a laptop computer, a portable electronic device, a gaming device, a mobile computing device, a portable computing device, a tablet computing device or the like. In some examples, the external source 20-2 may be a camera to capture an image. The raw data may be generated from an image or video received or captured at the external source 20. In other examples, it is to be appreciated that the external source 20 may be a personal computer or smartphone, on which content may be created such that the raw data is generated automatically from the content. The content requesters 25 may also be any type of computing device used to communicate with the apparatus 50 over the network 210 for receiving three-dimensional representation of a pose to animate. For example, content requesters 25 may be a computer animator searching for scale-agnostic representation of a pose to apply to an object, such as a hand.

Figure 6:
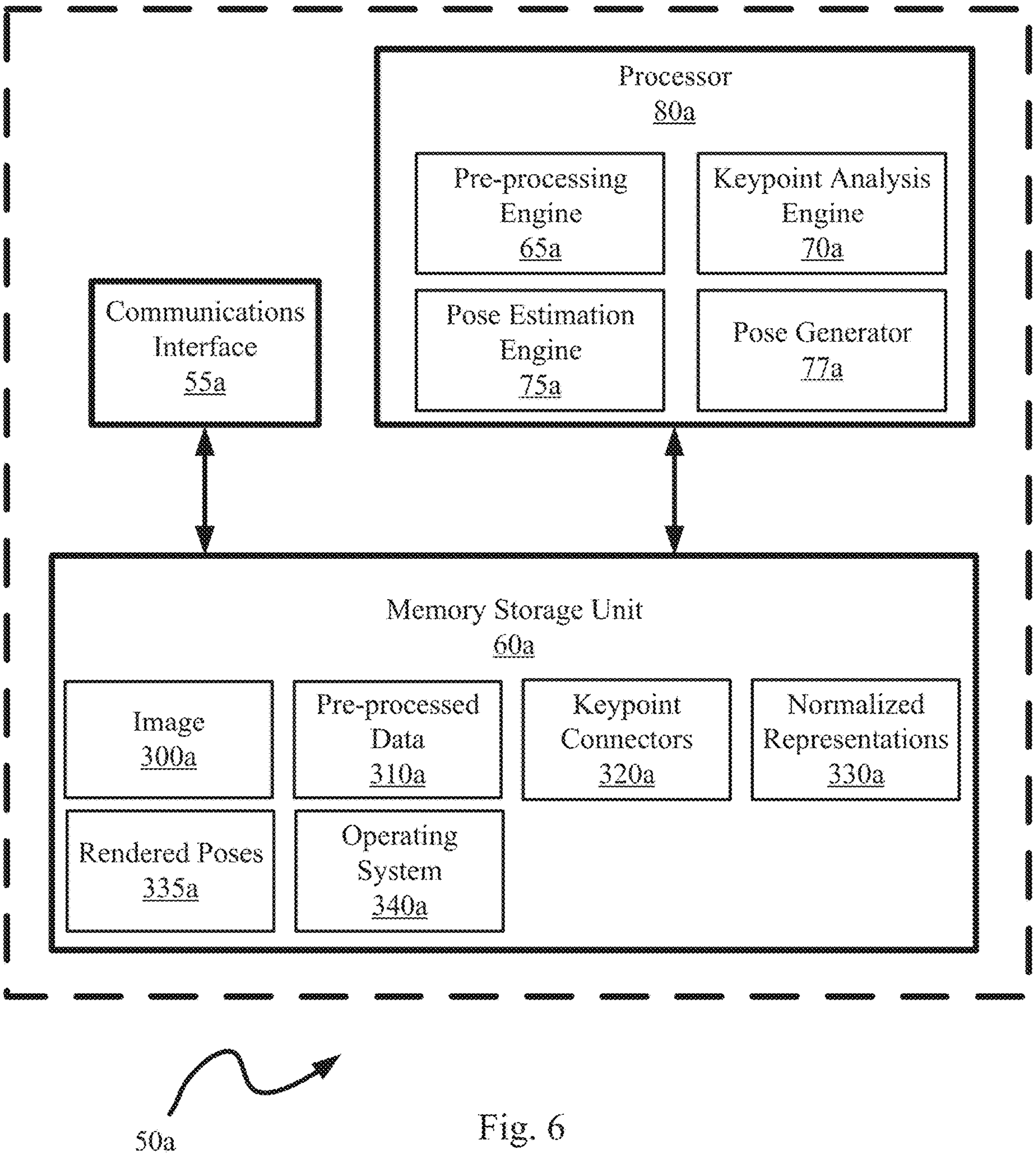
FIG. 6 is a schematic representation of the components of another example apparatus to generate a three-dimensional representation of a pose.

Referring to FIG. 6, another schematic representation of an apparatus 50*a* to generate a three-dimensional representation of a pose is generally shown. Like components of the apparatus 50*a* bear like reference to their counterparts in the apparatus 50, except followed by the suffix "a". In the present example, the apparatus 50*a* includes a communications interface 55*a*, a memory storage unit 60*a*, and a processor 80*a*. In the present example, the processor 80*a* includes a pre-processing engine 65*a*, a keypoint analysis engine 70*a*, a pose estimation engine 75*a*, and a pose generator 77*a*.

In the present example, the memory storage unit 60*a* maintains databases to store various data used by the apparatus 50*a*. For example, the memory storage unit 60*a* may include a database 300*a* to store raw data images received from an external source, a database 310*a* to store the data generated (i.e. identified keypoints) by the pre-processing engine 65*a*, a database 320*a* to store the keypoint connectors identified by the keypoint analysis engine 70*a*, a database 330*a* to store the normalized representations of the pose of the object generated by the pose estimation engine 75*a*, and a database 335*a* to store rendered poses from the normalized representation generated by the pose generator 77*a*. In addition, the memory storage unit may include an operating system 340*a* that is executable by the processor 80*a* to provide general functionality to the apparatus 50*a*. Furthermore, the memory storage unit 60*a* may be encoded with codes to direct the processor 80*a* to carry out specific steps to perform a method described in more detail below. The memory storage unit 60*a* may also store instructions to carry out operations at the driver level as well as other hardware drivers to communicate with other components and peripheral devices of the apparatus 50*a*, such as various user interfaces to receive input or provide output.

In the present example, the processor 80*a* is to operate the pose generator 77*a*. The pose generator 77*a* is to apply a template to generate or render a pose of an object a based on the normalized representation of the pose. The manner by which the pose of an object is rendered from the normalized representation is not particularly limited. For example, the normalized three-dimensional representation of a pose may be fit to a template skeleton. A root of the object may be defined as a starting point for rendering the pose of an object. The root is not particularly limited and may be chosen to be a keypoint corresponding to a wrist of a hand. Accordingly, by following each directional vector from the root along a kinematic chain, the vectors may accumulate to represent the corresponding keypoint connector directions. This will result in an estimated pose in which all keypoint connectors have the same length, which may not represent an anatomically correct pose. Accordingly, the keypoint connectors may be scaled in accordance with the definitions of the end keypoints of each connector or bone. When employing these realistic scales, the resulting pose may be aesthetic and anatomically correct as the original three-dimensional pose, even if the scale and proportions of the object may be different from the original object.

Figure 7:
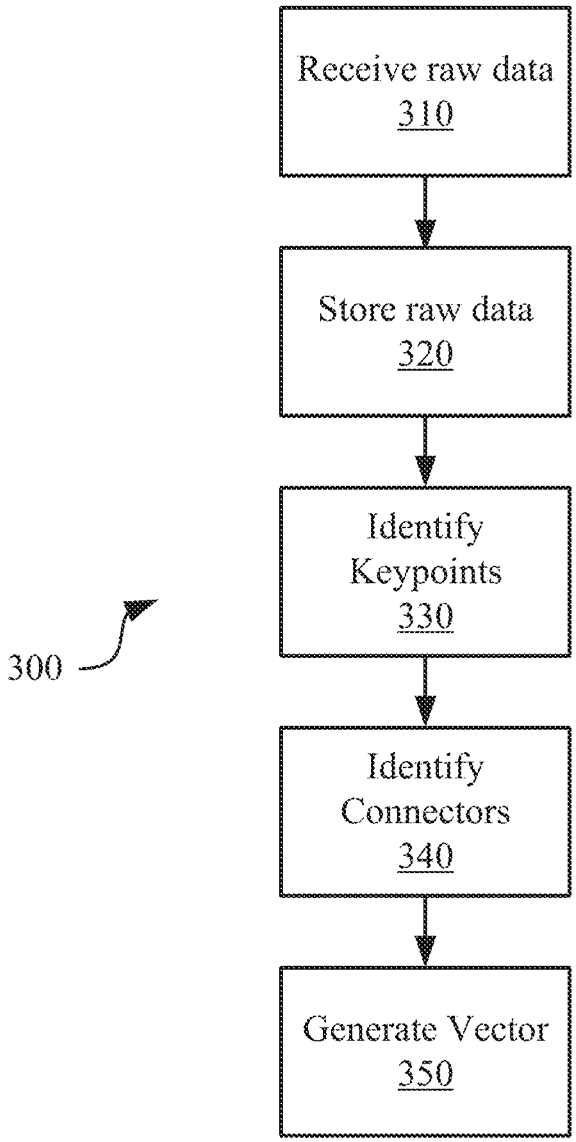
FIG. 7 is a flowchart of an example of a method of generating a three-dimensional representation of a pose.

Referring to FIG. 7, a flowchart of an example method of generating and assigning a mechanical weight index based on a single two-dimensional image for mesh skinning is generally shown at 300. In order to assist in the explanation of method 300, it will be assumed that method 300 may be performed by the apparatus 50. Indeed, the method 300 may be one way in which the apparatus 50 may be configured. Furthermore, the following discussion of method 300 may lead to a further understanding of the apparatus 50 and it components. In addition, it is to be emphasized, that method 300 may not be performed in the exact sequence as shown, and various blocks may be performed in parallel rather than in sequence, or in a different sequence altogether.

Beginning at block 310, the apparatus 50 receives raw data from an external source via the communications interface 55. In the present example, the raw data includes a two-dimensional representation of a hand. However, in other examples, the raw data may include a representation of another object capable of having multiple poses. Once received at the apparatus 50, the raw data is to be stored in the memory storage unit 60 at block 320.

Block 330 involves identifying a plurality of visible keypoints in the image with the pre-processing engine 65. The visible keypoints is to generally provide a representation of the of the person in the raw image. The manner by which the keypoints are identified is not particularly limited. For example, the keypoints may be extracted from the two-dimensional image based on matching a set of predefined keypoint definitions from a known structure of the object. At block 340, the keypoint analysis engine 70 is to identify connectors between each keypoint identified by the pre-processing engine 65.

Block 350 comprises the pose estimation engine generating a vector for each keypoint connector. The vector includes a direction and is to be normalized to a magnitude, such as one. Accordingly, the normalized vectors may be combined to generate a normalized representation of the pose of the hand from the image received at block 310.

Various advantages will not become apparent to a person of skill in the art. For example, the scale-agnostic representation of a pose may be used to estimate the pose of an object such as a hand. In particular, the input for the apparatus 50 may be an image containing a hand and the output may be a set of three-dimensional vectors of unit length that represent the directions of the connectors in an object, such as bones in the hand. Furthermore, the normalized representation may be used to render a three-dimensional annotation or estimated by the model, a corresponding pose may be generated by applying the predefined structure in the associated keypoint definition.

It should be recognized that features and aspects of the various examples provided above may be combined into further examples that also fall within the scope of the present disclosure.

I claim:

1. An apparatus comprising:
- a communications interface configured to receive raw data that includes a representation of an object;
- a memory storage unit configured to store the raw data;
- a pre-processing engine configured to:
  - identify a plurality of visible keypoints from the raw data, and
  - generate a heatmap for each of the plurality of visible keypoints, so as to generate a plurality of heatmaps, wherein each heatmap of the plurality of heatmaps represents a position of a corresponding one of the plurality of visible keypoints in two-dimensional space;
- a keypoint analysis engine configured to identify a plurality of connectors,
- wherein each connector of the plurality of connectors represents a connection between a pair of visible keypoints of the plurality of visible keypoints; and
- a pose estimation engine configured to generate a plurality of vectors to represent the plurality of connectors,
- wherein each vector of the plurality of vectors includes a direction and is normalized to an associated magnitude such that the plurality of vectors are unit vectors.

2. The apparatus of claim 1, wherein the plurality of visible keypoints is a plurality of joints, wherein each joint of the plurality of joints represents a rotation point of the object.

3. The apparatus of claim 1, wherein the keypoint analysis engine uses a keypoint definition to identify the plurality of connectors.

4. The apparatus of claim 1, wherein the keypoint analysis engine uses a known structure to identify the plurality of connectors.

5. The apparatus of claim 1,
- wherein the pose estimation engine is further configured to generate a three-dimensional representation of a pose of the object based on the plurality of vectors.

6. The apparatus of claim 1, wherein the pre-processing engine estimates a position of an invisible keypoint.

7. The apparatus of claim 6, wherein the keypoint analysis engine estimates a connection between the invisible keypoint and a visible keypoint selected from the plurality of visible keypoints.

8. The apparatus of claim 7, wherein the keypoint analysis engine estimates the connection between the invisible keypoint and the visible keypoint based on a kinematic chain.

9. The apparatus of claim 1, further comprising a pose generator to apply a template to generate a pose of the object based on the plurality of vectors.

10. A method comprising:
- receiving, via a communications interface, raw data that includes a representation of a hand;
- storing the raw data in a memory storage unit;
- identifying a plurality of visible keypoints from the raw data with a pre-processing engine;
- generating a heatmap for each of the plurality of visible keypoints, so as to generate a plurality of heatmaps,
  - wherein each heatmap of the plurality of heatmaps represents a position of a corresponding one of the plurality of visible keypoints in two-dimensional space;
- identifying a plurality of connectors, each of which is representative of a connection between a pair of the plurality of visible keypoints; and
- generating a plurality of vectors to represent the plurality of connectors,
  - wherein each vector of the plurality of vectors includes a direction and is normalized to an associated magnitude.

11. The method of claim 10, wherein the plurality of visible keypoints is a plurality of joints, wherein each joint of the plurality of joints represents a rotation point of the hand.

12. The method of claim 10, wherein identifying each connector of the plurality of connectors comprises using a keypoint definition.

13. The method of claim 10, wherein identifying the plurality of connectors is based on a known structure of the hand.

14. The method of claim 10, wherein the plurality of connectors is associated with the hand.

15. The method of claim 10, further comprising estimating a position of an invisible keypoint.

16. The method of claim 15, further comprising estimating a connection between the invisible keypoint and a visible keypoint selected from the plurality of visible keypoints.

17. The method of claim 16, wherein estimating the connection between the invisible keypoint and a visible keypoint is based on a kinematic chain.

18. The method of claim 10, further comprising applying a template to generate a pose of the hand based on the vector.

19. A non-transitory computer readable medium encoded with codes, wherein the codes are to direct a processor to:
- receive raw data that includes a representation of a hand;
- identify a plurality of visible keypoints from the raw data;
- generate a heatmap for each of the plurality of visible keypoints, so as to generate a plurality of heatmaps,
  - wherein each heatmap of the plurality of heatmaps represents a position of a corresponding one of the plurality of visible keypoints in two-dimensional space;
- identify a plurality of connectors,
  - wherein each connector of the plurality of connectors represents a connection between a pair of visible keypoints of the plurality of visible keypoints; and
- generate a plurality of vectors to represent the plurality of connectors,
  - wherein each vector includes a direction and is normalized to an associated magnitude.

20. The non-transitory computer readable medium claim 19, wherein the codes are to direct the processor to:
- estimate a connection between a invisible keypoint and a visible keypoint selected from the plurality of visible keypoints based on a kinematic chain; and
- apply a template to generate a pose of the hand based on the plurality of vectors.

* * * * *